(12) United States Patent
Hashimoto et al.

(10) Patent No.: US 7,514,669 B2
(45) Date of Patent: Apr. 7, 2009

(54) IMAGING APPARATUS AND LIGHT SOURCE ESTIMATING DEVICE FOR THE IMAGING APPARATUS

(75) Inventors: Yasunari Hashimoto, Kanagawa (JP); Mitsuharu Ohki, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 11/798,069

(22) Filed: May 10, 2007

(65) Prior Publication Data

US 2008/0001063 A1    Jan. 3, 2008

(30) Foreign Application Priority Data

May 11, 2006   (JP) .............................. 2006-132882

(51) Int. Cl.
  *G01J 3/50* (2006.01)
  *H01J 5/16* (2006.01)
  *H01J 40/14* (2006.01)

(52) U.S. Cl. ..................................... 250/226
(58) Field of Classification Search .................. 250/226
  See application file for complete search history.

(56) References Cited

U.S. PATENT DOCUMENTS

2006/0103728 A1*   5/2006   Ishigami et al. ............. 348/180

OTHER PUBLICATIONS

S. Tominaga et al., "Standard surface-reflectance model and illuminant estimation", J. Opt. Soc. Am., vol. 6, No. 4 (1989), pp. 576-584.

* cited by examiner

*Primary Examiner*—Seung C Sohn
(74) *Attorney, Agent, or Firm*—Finnegan, Henderson, Farabow, Garrett & Dunner, L.L.P.

(57) ABSTRACT

A light source estimating device includes: a distribution holding section holding a spectral energy distribution of a specific light source as a specular reflection component; a set generating section generating a set determined by the specular reflection component and pixel data of the input image in a predetermined space, with respect to each pixel data of the input image; a detecting section detecting, with respect to each pixel data of the input image, another pixel data neighboring the pixel data and included in the set; and a determining section determining whether or not the specific light source corresponds to the light source used during capture, by setting a likelihood that the specific light source corresponds to the light source used during capture high if the other pixel data exists, and setting a likelihood that the specific light source corresponds to the light source used during capture low if the other pixel data does not exist.

10 Claims, 15 Drawing Sheets

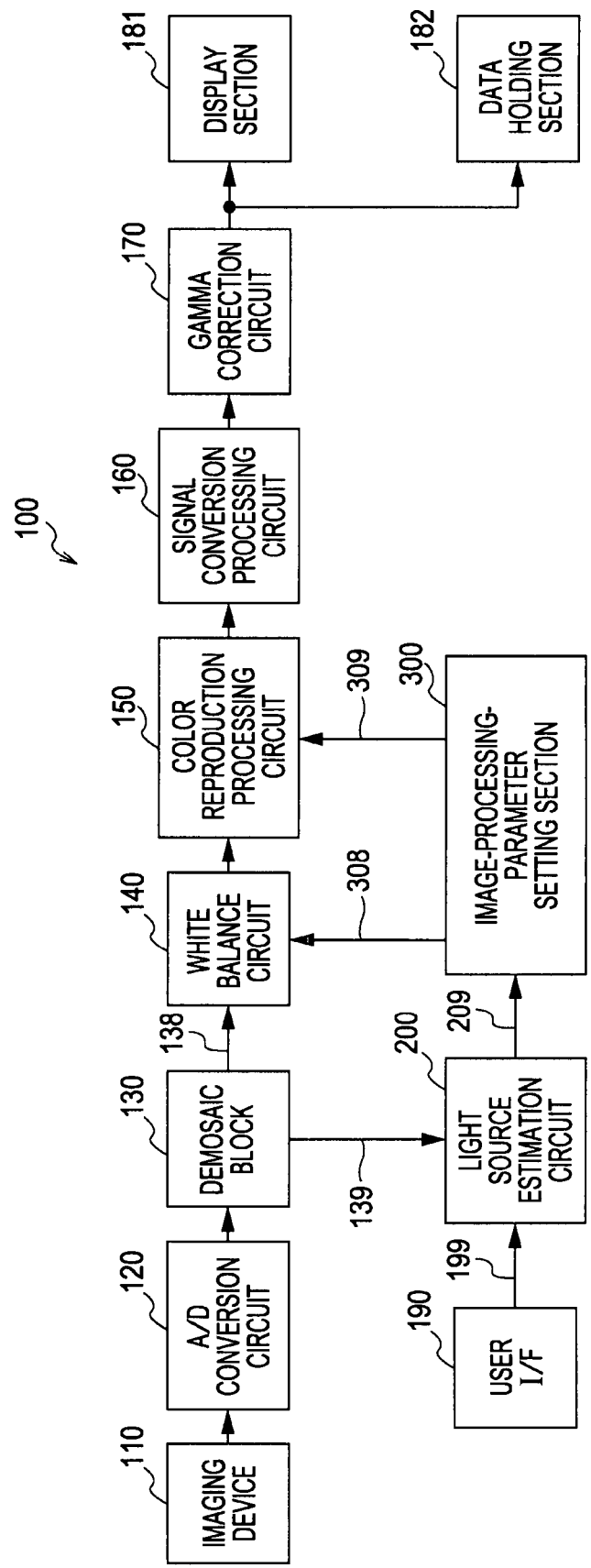

FIG. 11
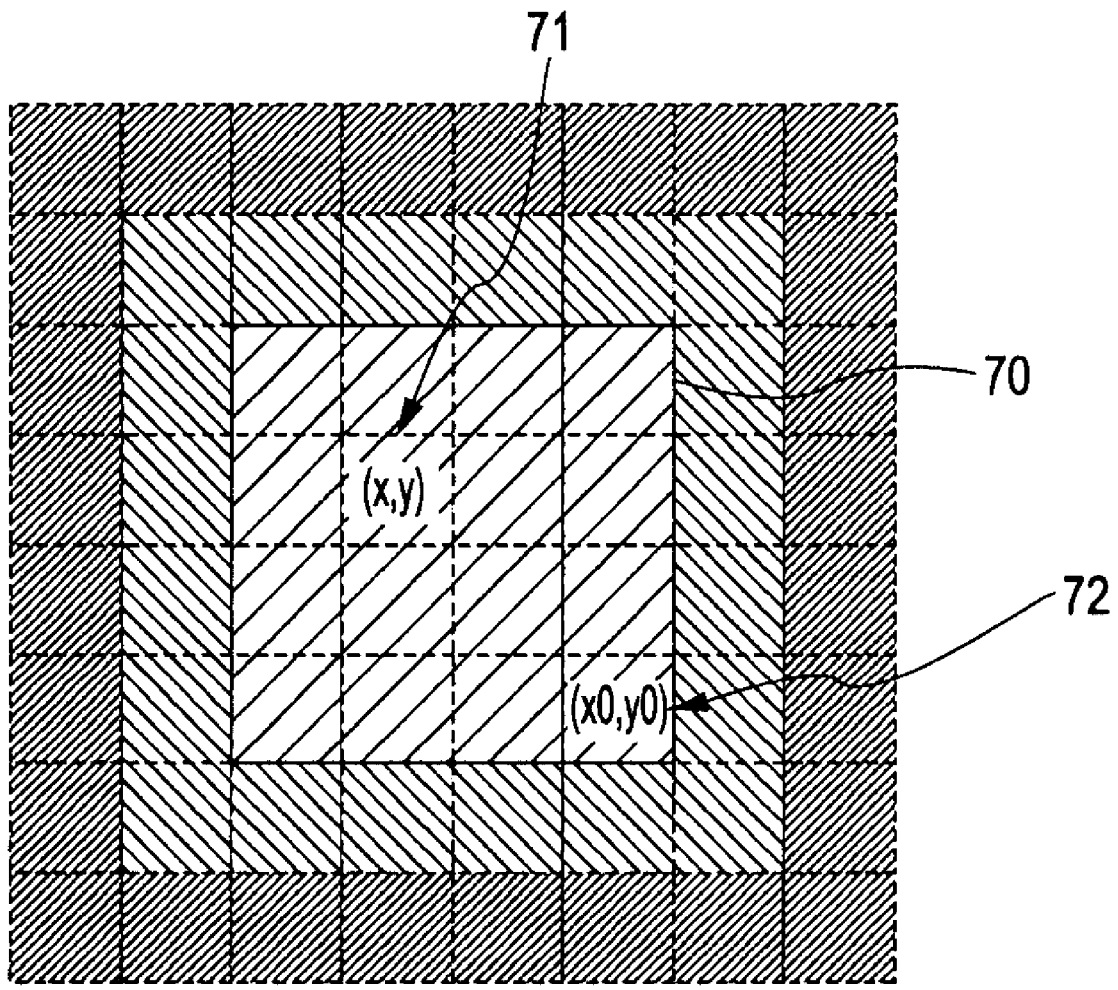
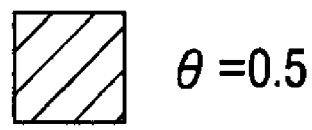 θ=0.5
 θ=0.6
 θ=0.7

IMAGING APPARATUS AND LIGHT SOURCE ESTIMATING DEVICE FOR THE IMAGING APPARATUS

CROSS REFERENCES TO RELATED APPLICATIONS

The present invention contains subject matter related to Japanese Patent Application JP 2006-132882 filed in the Japanese Patent Office on May 11, 2006, the entire contents of which are incorporated herein by reference.

BACKGROUND OF THE INVENTION

1. Field of the Invention

The present invention relates to an imaging apparatus, and more specifically to an imaging apparatus having the function of estimating the kind of a light source used in the capture of an input image, and a processing method thereof and a program for causing a computer to execute the method.

2. Description of the Related Art

The human eye has a function called chromatic adaptation whereby it perceives a white object as being white even when there is a change in light source. This function allows the human to perceive a white object as being white even through a change occurs in the spectral distribution of a light source depending on the sun's altitude. It is due to this color adaptation function that a white object can be perceived as being white even under a fluorescent lamp whose spectral distribution completely differs from that of sunlight. The "white balance function" attempts to realize such a function in an apparatus.

There are cases where, even when a white object can be seen as white by means of the white balance function, due to the influence of differences between the "spectral sensitivity of an image sensor" and the "spectral sensitivity of the human eye", a color may not be reproduced as it looks. A function called "color reproduction function" is provided as a function for correcting this situation. Since the parameters for the "white balance function" and "color reproduction function" are represented in matrix form, at the implementation stage, these are sometimes combined into single processing in a single matrix.

To realize the white balance function, on the basis of the Evan's theory (gray world hypothesis), an algorithm for effecting overall control in combination with blackbody radiation locus information has been commonly used. The Evans' theory is a hypothesis stating that the sum of the colors of the subjects in the world is gray. Further, the black body radiation locus refers to the locus of a color changing from gold bronze, red, orange, yellow, green, and blue emitted from a perfect blackbody upon heating the black body. Since natural light is generally on the blackbody radiation locus, the blackbody radiation locus is used as a reference when handling color information of natural light.

However, the Evan's theory may not hold true under conditions in which the integral of all the effective pixels in a screen does not result in gray, as in the case of scenes with the sky imaged on the entire screen or scenes surrounded by trees. For instance, in the case of scenes with the sky imaged on the entire screen, performing control under the assumption that the Evans' theory holds true may result in erroneous light source estimation.

In view of this, as a high-accuracy light source estimation method, an estimation method using a specular component (hereinafter, referred to as the specular method) has been proposed in the related art. According to this specular method, by drawing attention to the fact that the reflectance of an object is divided into two components, a diffuse reflection component (material component) for reflecting each color by the inherent spectral reflectance of the object and a specular reflection component (specular component) that does not depend on the color of the object, objects that are equal in material component are grouped together and a plane is generated in color space for each individual group. Then, the vector in the direction of intersection of the respective planes thus generated is outputted as a specular component (that is, as the spectral energy distribution of a light source) (see, for example, Shoji Tominaga, Brian A. Wandell, "Standard surface-reflectance model and light source estimation", Journal of Optical Society of America, Vol. 6, No. 4, April 1989, p. 576-584).

SUMMARY OF THE INVENTION

However, the above-mentioned specular method requires as a prerequisite that objects that are equal in material component be grouped together. That is, it is necessary to grasp in advance which pixels are the pixels on which objects of equal material component are projected. This means that it is necessary to manually specify the portions of equal material component from a projected image, that is, the corresponding projected image portions present in a single-color object image. Performing such processing for each image capturing operation is cumbersome, and it may not be practical to require such processing as a prerequisite.

It is desired to estimate the kind of a light source used during image capture without manually specifying the portions of equal material component.

While in the specular method of the related art "pixels are grouped" to determine the "spectral energy distribution of a light source", according to the present invention, by "assuming a given spectral energy distribution of a light source" and determining "how pixels are grouped", it is estimated whether or not an assumed light source is a correct light source.

According to an embodiment of the present invention, there is provided a light source estimating device for estimating a kind of a light source used during capture of an input image, including: distribution holding means for holding a spectral energy distribution of a specific light source as a specular reflection component; set generating means for generating a set determined by the specular reflection component and pixel data of the input image in a predetermined space, with respect to each pixel data of the input image; detecting means for detecting, with respect to each pixel data of the input image, another pixel data neighboring the pixel data and included in the set; and determining means for determining whether or not the specific light source corresponds to the light source used during capture, by setting a likelihood that the specific light source corresponds to the light source used during capture high if the other pixel data exists, and setting a likelihood that the specific light source corresponds to the light source used during capture low if the other pixel data does not exist. This provides an advantage in that the determination as to whether an assumed light source corresponds to the light source used during capture is made on the basis of the relationship with respect to the neighboring pixel data included in the set determined by the specular reflection component of the assumed light source and the pixel data of the input image.

In the above-mentioned embodiment, the set may include at least a part of a two-dimensional plane in color space. For example, a half plane corresponds to such a set.

In the above-mentioned embodiment, the specular reflection component may be a vector component whose initial position is an origin in color space.

According to an embodiment of the present invention, there is provided a light source estimating device for estimating a kind of a light source used during capture of an input image, including: distribution holding means for holding spectral energy distributions of a plurality of light sources as specular reflection components; set generating means for generating a set determined by the specular reflection component and pixel data of the input image for each of the plurality of light sources in a predetermined space, with respect to each pixel data of the input image; area-size generating means for finding, for each of the plurality of light sources and with respect to each pixel data of the input image, a size of an area neighboring the pixel data and included in the set; and determining means for determining, from among the plurality of light sources, a light source with the largest area size as corresponding to the light source used during capture. This provides an advantage in that the light source used during capture is estimated from the size of the neighboring area included in the set determined by the specular reflection component of the assumed light source and the pixel data of the input image.

According to an embodiment of the present invention, there is provided an imaging apparatus including: imaging means for capturing an input image; distribution holding means for holding spectral energy distributions of a plurality of light sources as specular reflection components; set generating means for generating a set determined by the specular reflection component and pixel data of the input image for each of the plurality of light sources in a predetermined space, with respect to each pixel data of the input image; area-size generating means for finding, for each of the plurality of light sources and with respect to each pixel data of the input image, a size of an area neighboring the pixel data and included in the set; determining means for determining, from among the plurality of light sources, a light source with the largest area size as corresponding to the light source used during capture; white balance processing means for performing white balance processing of the input image in accordance with a result of the determination; and color reproduction processing means for performing color reproduction processing with respect to an output of the white balance processing means in accordance with a result of the determination. This provides an advantage in that the imaging apparatus performs imaging by estimating the light source used during capture from the size of the neighboring area included in the set determined by the specular reflection component of the assumed light source and the pixel data of the input image.

According to an embodiment of the present invention, there is provided a method or a program which is used in a light source estimating device to estimate a kind of a light source used during capture of an input image, the light source estimating device including distribution holding means for holding spectral energy distributions of a plurality of light sources as specular reflection components, the method comprising the steps of, or the program causing a computer to execute the steps of: generating a set determined by the specular reflection component and pixel data of the input image for each of the plurality of light sources in a predetermined space, with respect to each pixel data of the input image; finding, for each of the plurality of light sources and with respect to each pixel data of the input image, a size of an area neighboring the pixel data and included in the set; and determining, from among the plurality of light sources, a light source with the largest area size as corresponding to the light source used during capture. This provides an advantage in that the light source used during capture is estimated from the size of the neighboring area included in the set determined by the specular reflection component of the assumed light source and the pixel data of the input image.

The present invention can provide an advantage in that the kind of a light source used during capture can be estimated without specifying portions of equal material component manually.

BRIEF DESCRIPTION OF THE DRAWINGS

FIG. 1 is a diagram showing an example of the configuration of an imaging apparatus according to an embodiment of the present invention.

FIG. 11 is a diagram showing an example of an area in the neighborhood of a pixel position (x, y) according to the embodiment of the present invention;

DESCRIPTION OF THE PREFERRED EMBODIMENTS

Figure 2A:
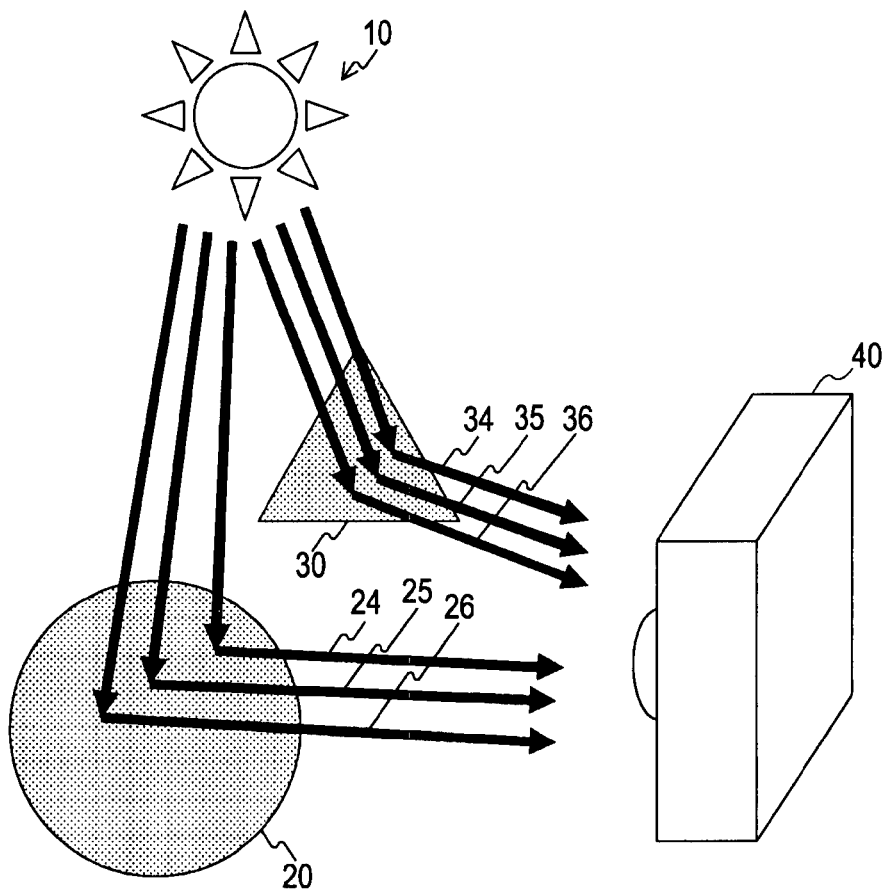
FIGS. 2A and 2B are diagrams showing a color image capture model.

An embodiment of the present invention will now be described with reference to the drawings.

FIG. 1 is a diagram showing an example of the configuration of an imaging apparatus 100 according to an embodiment of the present invention. The imaging apparatus 100 includes an imaging device 110, an A/D (Analog to Digital) conversion circuit 120, a demosaic block 130, a white balance circuit 140, a color reproduction processing circuit 150, a signal conversion processing circuit 160, a gamma correction circuit 170, a display section 181, a data holding section 182, a user interface (abbreviated as "user I/F" in the drawing) 190, a light source estimation circuit 200, and an image-processing-parameter setting section 300.

The imaging device 110 is a photoelectric conversion element for converting optical information of an input image into an electrical signal (voltage value), and is also referred to as an image sensor. As the imaging device 110, for example, a CCD (Charge Coupled Device) is used.

While an image sensor having three kinds of color filter of red (R: Red), green (G: Green), and blue (B: Blue) is commonly used as the imaging device 110, other than this, for example, a color filter of emerald (E: Emerald) or orange (O: orange) may be added.

The A/D conversion circuit 120 is a circuit for converting an analog signal supplied from the imaging device 110 into a digital signal. Each pixel of an input image is quantized by the A/D conversion circuit 120 into pixel data of, for example, 14 bits.

The demosaic block 130 performs demosaic process with respect to pixel data. Herein, demosaic process refers to a process of performing interpolation with respect to pixel data with one color per pixel by using data of neighboring pixels so that respective colors (for example, RGB) are produced for each pixel. The result of this interpolation is supplied to the white balance circuit 140 via a signal line 138, and to the light source estimation circuit 200 via a signal line 139.

On the basis of the pixel data supplied from the demosaic block 130, the light source estimation circuit 200 estimates the light source used during capture of an input image. The configuration and contents of this processing will be described later. The result of estimation by the light source estimation circuit 200 is supplied to the image-processing-parameter setting section 300 via a signal line 209.

The image-processing-parameter setting section 300 sets the parameters for image processing corresponding to the light source estimated by the light source estimation circuit 200. That is, the image-processing-parameter setting section 300 supplies white balance gains to the white balance circuit 140 via a signal line 308, and supplies a color correction matrix corresponding to the light source estimated by the light source estimation circuit 200 to the color reproduction processing circuit 150 via a signal line 309.

It should be noted that the image-processing-parameter setting section 300 can be realized by, for example, a CPU (Central Processing Unit) such as a microprocessor.

The white balance circuit 140 performs white balance processing by multiplying the RGB image data supplied from the demosaic block 130 by corresponding white balance gains supplied from the image-processing-parameter setting section 300.

The color reproduction processing circuit 150 performs color reproduction processing by multiplying the pixel data on which white-balance processing has been performed by the white balance circuit 140, by the color correction matrix supplied from the image-processing-parameter setting section 300. The color reproduction processing circuit 150 performs mapping of the result of this color reproduction processing, for example, RGB pixel data, to XYZ space.

The signal conversion processing circuit 160 performs conversion from coordinates in XYZ space into YCC format, namely luminance Y, chrominance of blue Cb, and chrominance of red Cr. The gamma correction circuit 170 performs gamma correction according to a gamma value of the display section 181 or the like.

The display section 181 is a display such as an LCD (Liquid Crystal Display). The display section 181 displays an input image supplied from the gamma correction circuit 170 as a monitor image when the shutter button is not depressed. The data holding section 182 is a recording medium, and holds an input image supplied from the gamma correction circuit 170 when the shutter button is depressed.

The user interface 190 is a hardware switch or a software GUI (Graphical User Interface) provided in the imaging apparatus 100. The above-mentioned shutter button is also an example of the user interface 190.

FIG. 2A is a diagram showing a color image capture model. In this case, description will be given of the process in which light radiated from a light source 10 is reflected by the surfaces of objects 20 and 30 and received by an imaging apparatus 40.

The objects 20 and 30 are each a single-color object. Hence, the objects 20 and 30 are each constituted by a single material component (diffuse reflection component) (that is, the spectral reflectance of the object is constant). In this case, assuming three positions in the surface of each of the objects 20 and 30, light rays radiated from the light source 10 are respectively received by the imaging apparatus 40 through loci 24 to 26 and 34 to 36 as shown in FIG. 2A.

Figure 2B:
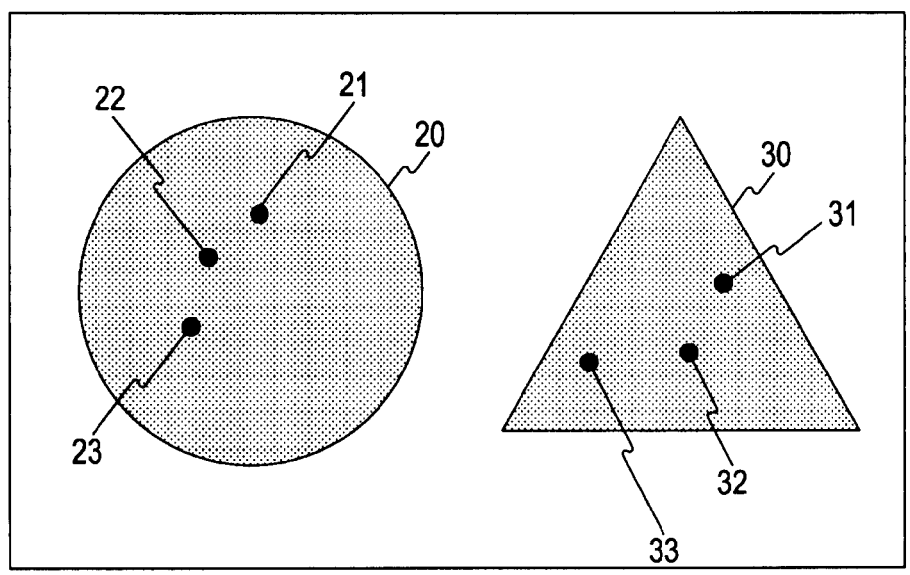

FIG. 2B shows an example of an image captured by the imaging apparatus 40. The light rays received through the loci 24 to 26 are projected onto the surface of the object 20 as points 21 to 23. Further, the light rays received through the loci 34 to 36 are projected onto the surface of the object 30 as points 31 to 33.

Figure 3:
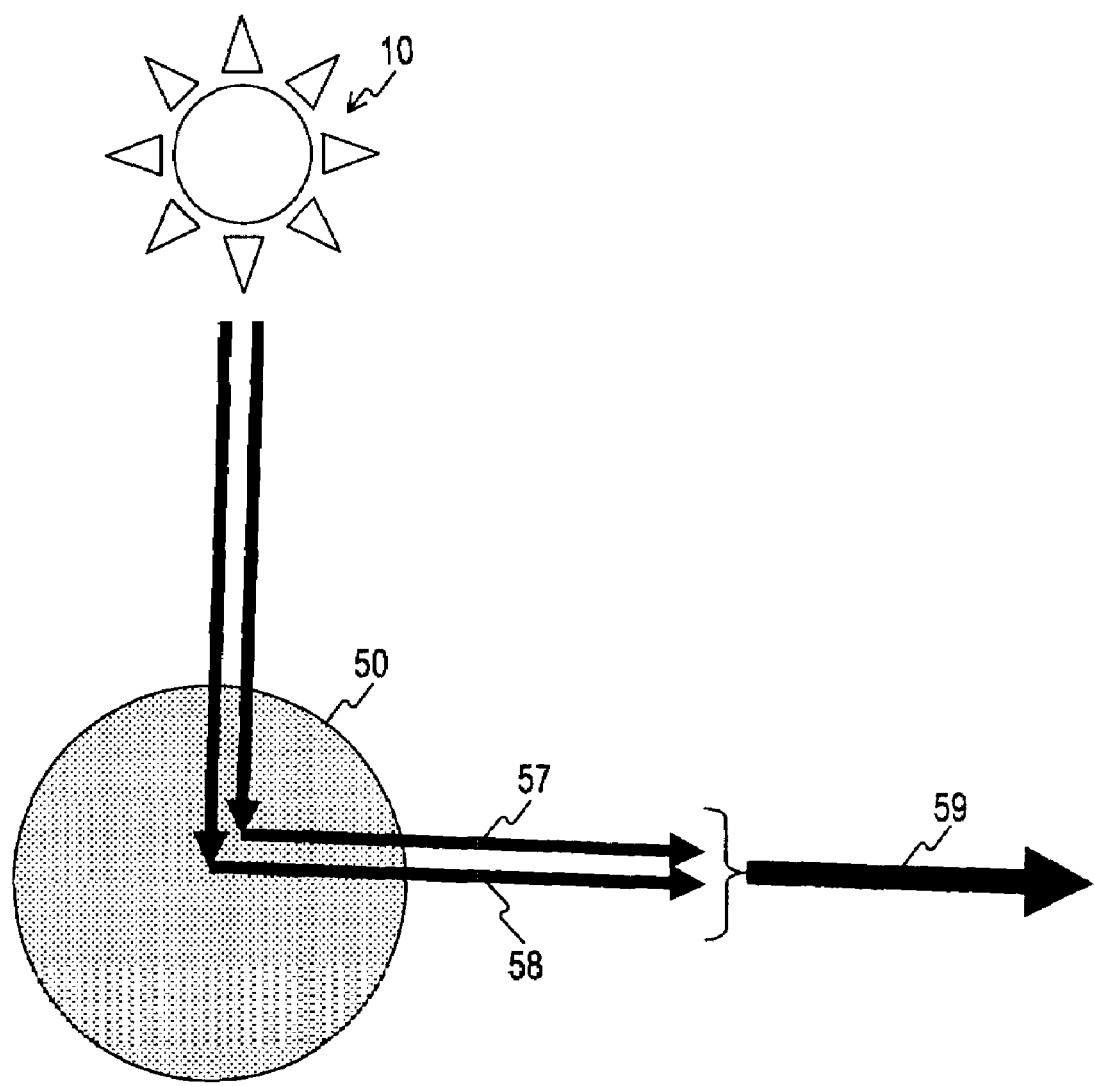
FIG. 3 is a diagram showing an example of a diffuse reflection component (material component) and specular reflection component (specular component)

FIG. 3 is a diagram showing an example of a diffuse reflection component (material component) and a specular reflection component (specular component). A light beam 59 produced as light from the light source 10 is reflected on the surface of an object 50 includes two components, a diffuse reflection component (material component 57) for reflecting each color by the inherent spectral reflectance of an object and a specular reflection component (specular component 58) that is not dependent on the color of an object.

Let the component of light outputted from the light source 10 be (Rs, Gs, Bs). In this case, Rs represents a red component of the light source 10, Gs represents a green component of the light source 10, and Bs represents a blue component of the light source 10.

Further, let the material component of the object 50 be (Rm, Gm, Bm). In this case, Rm represents "(spectral reflectance of red color of the object 50)×(red component of the light source 10)", Gm represents "(spectral reflectance of green color of the object 50)×(green component of the light source 10)", and Bm represents "(spectral reflectance of blue color of the object 50)×(blue component of the light source 10)". On the other hand, the specular component of the object 50 does not depend on the property of the object but coincides with the component of the light (Rs, Gs, Bs) radiated from the light source 10. The linear sum of these two components is the light beam 59. It should be noted that the weight W (W is a real number not smaller than 0) of each component in this linear sum is dependent on the incident angle and reflection angle of light with respect to the object 50.

Figure 4:
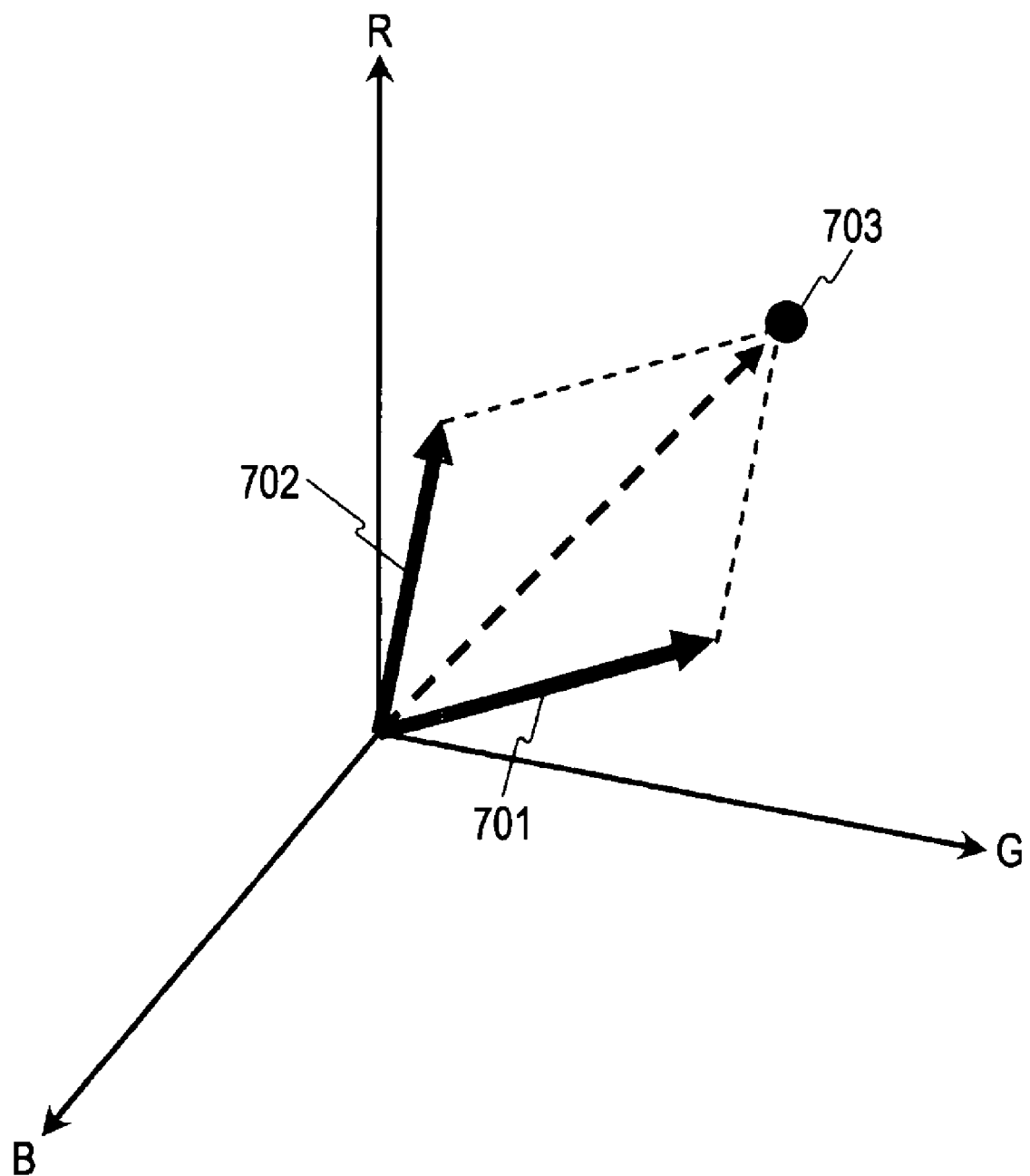
FIG. 4 is a diagram showing an example of pixel data in color space.

FIG. 4 is a diagram showing an example of pixel data in color space. Pixel data due to the light beam 59 is the total sum of the material component 57 and specular component 58. That is, pixel data 703 in color space (in this case, RGB 3-dimensional color space) is expressed as an addition of a vector 702 of the material component and a vector 701 of the specular component.

Figure 5A:
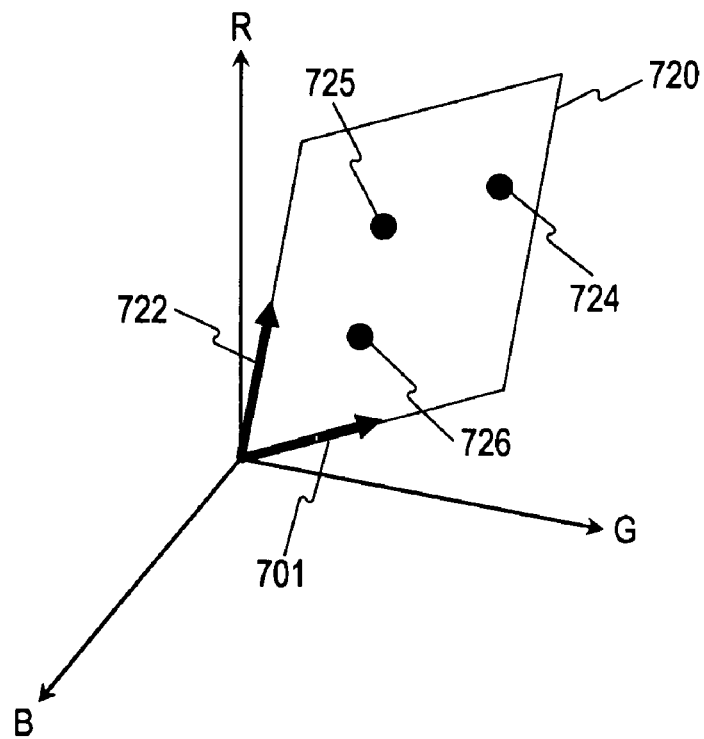
FIGS. 5A and 5B are diagrams showing an example of the relationship between distribution of pixel data and a half plane in color space.
Figure 5B:
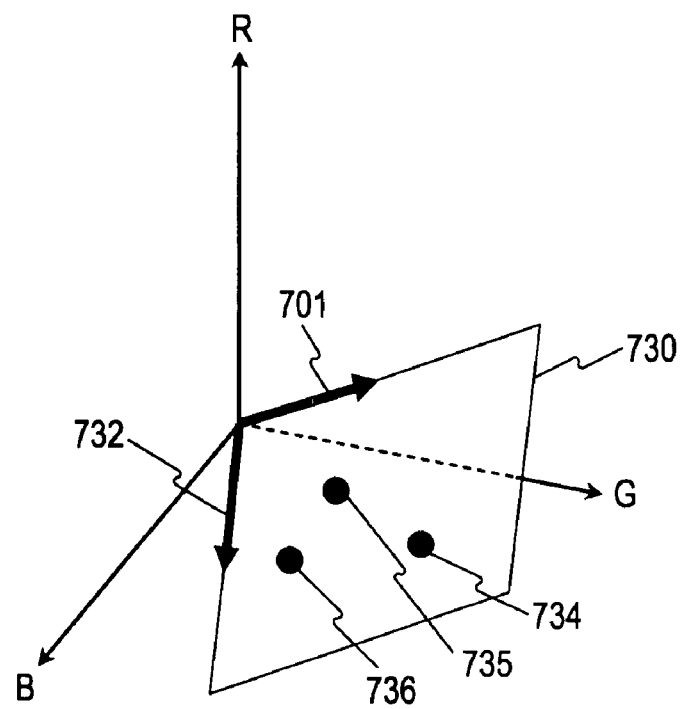

In view of this, as shown in FIGS. 5A and 5B, pixel data in color space due to each of the loci 24 to 26 and 34 to 36 is obtained for each of the objects 20 and 30.

FIG. 5A is a diagram showing an example of distribution of pixel data in color space due to the loci 24 to 26 of light rays reflected by the object 20. That is, pixel data 724 to 726 are pixel data due to the loci 24 to 26, respectively.

The pixel data 724 to 726 exist on the same plane since they are generated as light rays radiated from the same light source 10 are reflected by the same object 20. This plane is specified by the vector 701 of the specular component of the light source 10 and a vector 722 of the material component of the object 20. That is, the data of the projected image of the object 20 exists on a plane 720 spanned by the vector (Rs, Gs, Bs) (whose size is normalized to 1) and the vector (Rm2, Gm2, Bm2) (whose size is normalized to 1).

Likewise, FIG. 5B is a diagram showing an example of distribution of pixel data in color space due to the loci 34 to 36 of light beams reflected by the object 30. That is, pixel data 734 to 736 are pixel data due to the loci 34 to 36, respectively.

The pixel data 734 to 736 exist on the same plane since they are generated as light rays radiated from the same light source 10 are reflected by the same object 30. This plane is specified by the vector 701 of the specular component of the light source 10 and a vector 732 of the material component of the object 30. That is, the data of the projected image of the object 30 exists on a plane 730 spanned by the vector (Rs, Gs, Bs) (whose size is normalized to 1) and the vector (Rm3, Gm3, Bm3) (whose size is normalized to 1).

Figure 6:
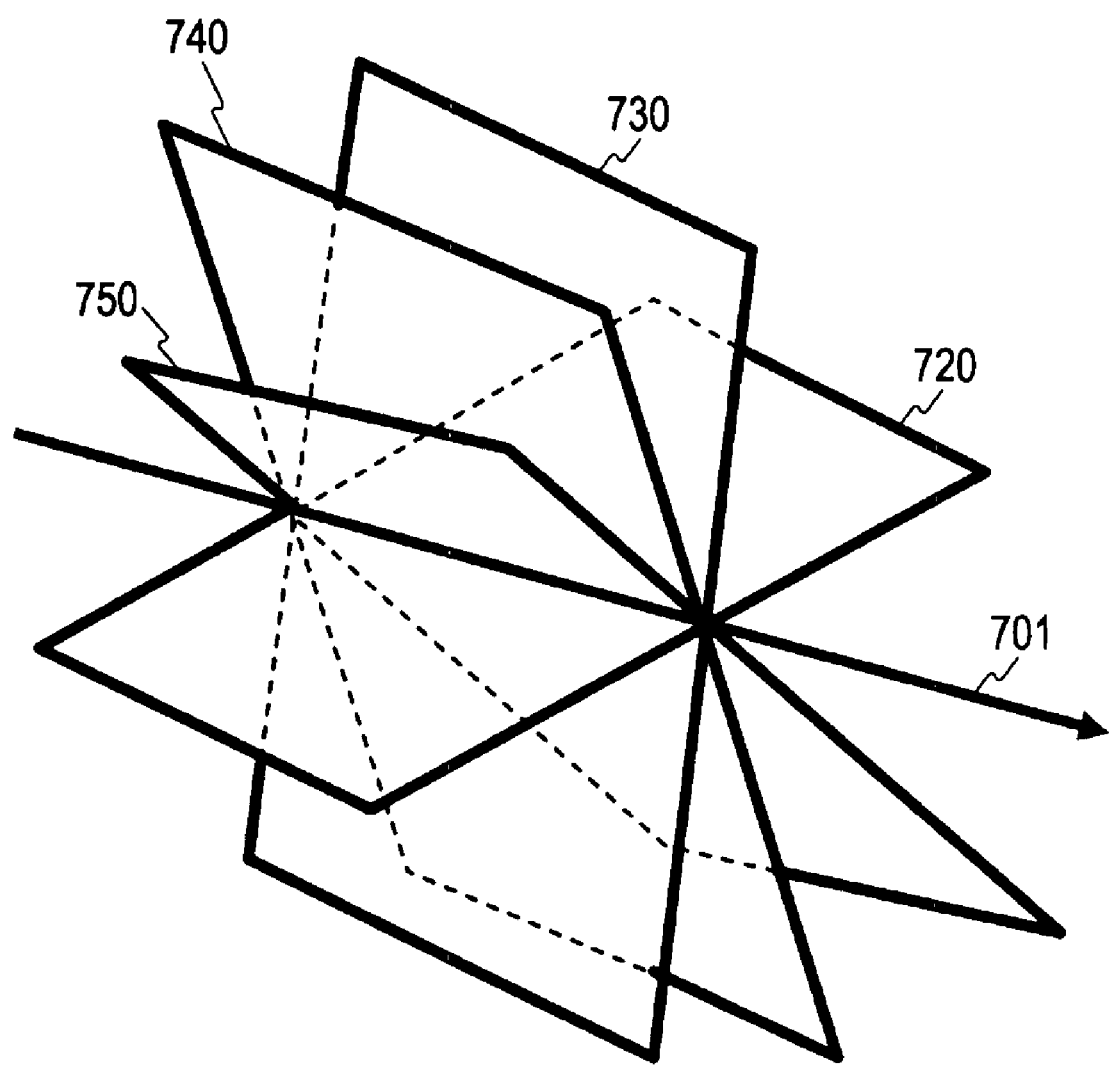
FIG. 6 is a diagram showing an example of the relationship between planes and a specular component in color space.

FIG. 6 is a diagram showing an example of the relationship between planes and a specular component in color space. When planes 740 and 750 generated as light beams radiated from the light source 10 by another object are considered in addition to the planes 720 and 730 generated as shown in FIGS. 5A and 5B, the intersection line of the planes 720 to 750 is the vector 701 of the specular component. This represents the principle of the specular method.

In the specular method according to the related art, pixel data is subjected to grouping to obtain the planes 720 to 750 as described above, and the intersection line of the planes 720 to 750 is determined to thereby generate a specular component, that is, a spectral energy distribution of a light source. In contrast, according to the embodiment of the present invention, a plane is generated by assuming a given spectral energy distribution of a light source from known ones, and by determining how pixel data are grouped, it is estimated whether or not an estimated light source is a correct light source.

Figure 7:
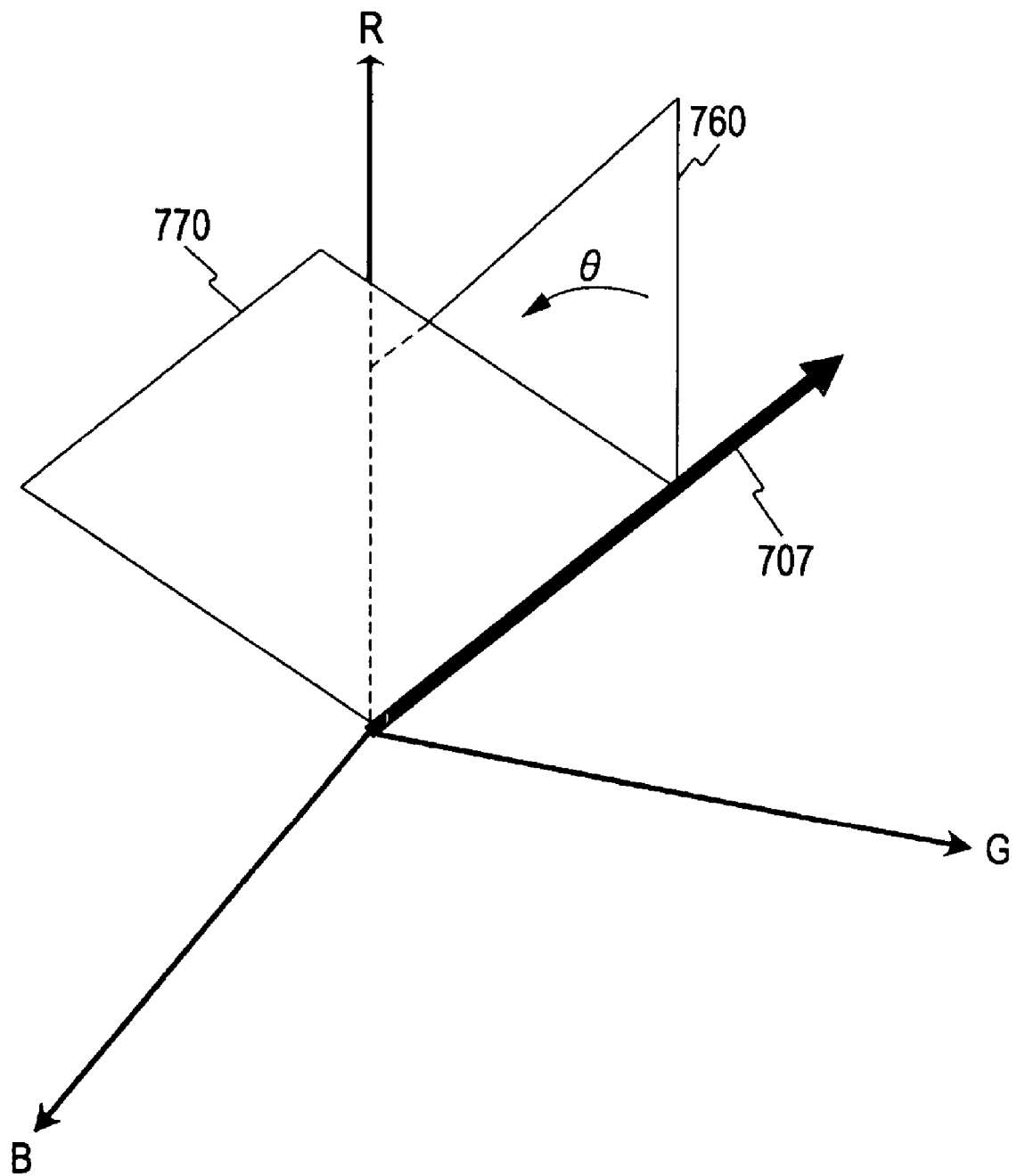
FIG. 7 is a diagram showing a case in which a half plane is specified according to the embodiment of the present invention.

FIG. 7 is a diagram showing a case in which a half plane is specified according to the embodiment of the present invention. As described above with reference to FIG. 6, the vector 701 of the specular component is the intersection line of the planes formed by pixel data. Now, a case is considered in which, assuming a half plane with a given unit vector 707 in 3-dimensional color space of RGB as the center, each half plane is specified by an angle indicative of its relation with respect to a reference half plane that serves as a reference.

In this case, a half plane 760 including the positive portion of the R axis is assumed as the reference half plane. A clockwise angle as seen from the origin is taken as $\theta$, and a half plane 770 is specified by using this angle $\theta$. In this case, $\theta$ is equal to or larger than 0 degree and smaller than 360 degrees. At this time, the half plane 770 includes a point (cos $\theta$, 0, sin $\theta$) in a plane of G=0 (plane specified by the R axis and the B axis).

It should be noted that a half plane refers to a collection of points that can be expressed as $\alpha$(Ur, Ug, Ub)+$\beta$(Vr, Vg, Vb), with respect to a given point U=(Ur, Ug, Ub) and unit vector (707)V=(Vr, Vg, Vb), wherein $\alpha$ is a real number not smaller than 0, and $\beta$ is a real number.

Figure 8A:
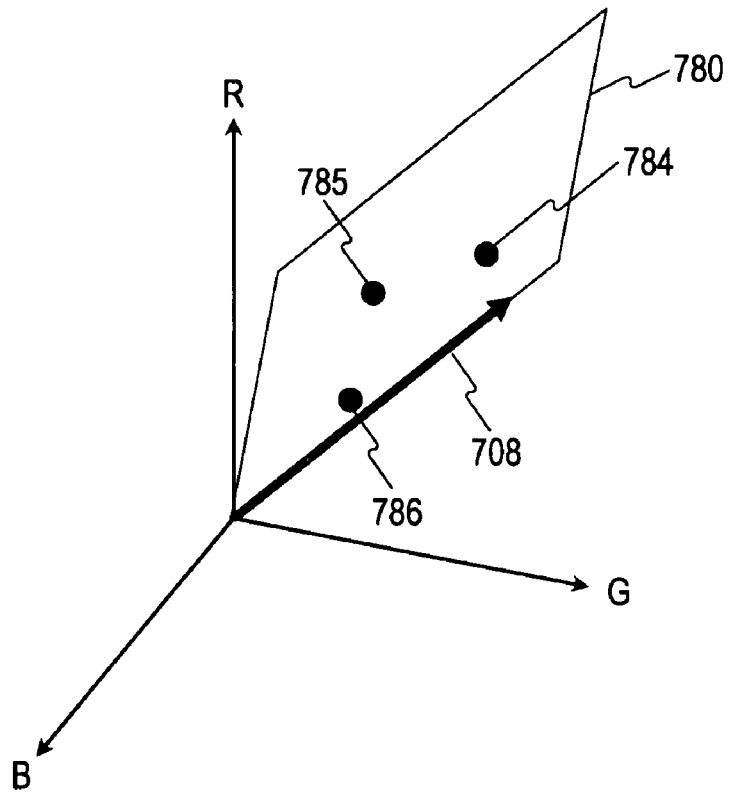
FIGS. 8A and 8B are diagrams showing the relationship between a light source and pixel data in color space.
Figure 8B:
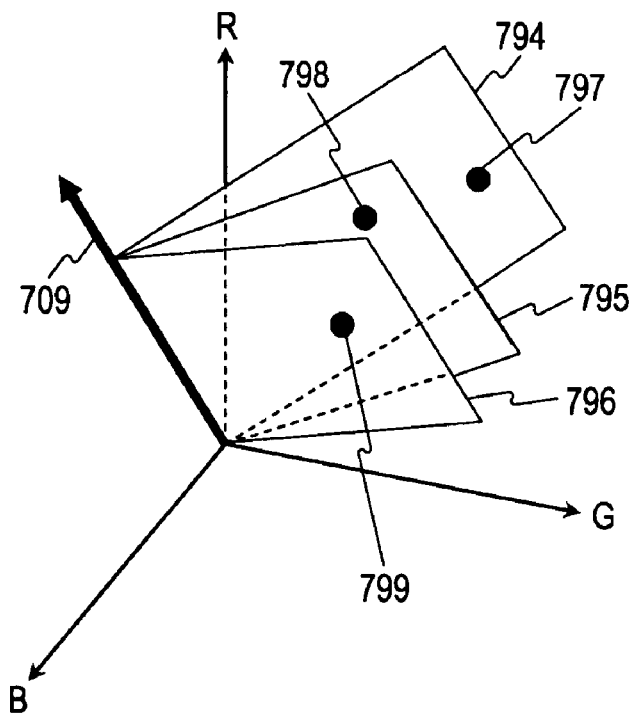

FIGS. 8A and 8B are diagrams showing the relationship between a light source and pixel data in color space. FIG. 8A shows a case where a unit vector 708 in RGB 3-dimensional color space is in the same direction as that of the component (Rs, Gs, Bs) of light outputted from the light source 10. Here, it is assumed that the vector size of (Rs, Gs, Bs) is normalized to 1. In this case, as described above with reference to FIGS. 5A and 5B, pixel data 784 to 786 exist on a half plane 780 including the unit vector 708. It should be noted that pixel data 784 to 786 represent pixel data of the same material component.

On the other hand, FIG. 8B shows a case where a unit vector 709 in RGB 3-dimensional color space is in a direction different from that of the component (Rs, Gs, Bs) of light outputted from the light source 10. In this case, pixel data 797 to 799 are respectively included in different half planes 794 to 796. It should be noted that pixel data 797 to 799 represent pixel data of the same material component.

As described above, depending on how a unit vector that serves as the center reference is assumed, the half plane specified by the unit vector varies. Further, when the unit vector is in the same direction as that of the component of the light source, pixel data with the same material component exist on the same half plane.

In view of this, according to the embodiment of the present invention, a specific light source is assumed in advance, and with the spectral distribution of that light source as the above-mentioned unit vector, the angle $\theta$ is determined with respect to each pixel data of an input image to specify a half plane, and it is estimated that the assumed light source is more likely to be correct as the angle $\theta$ becomes more equal among neighboring pixel data. This takes advantage of the fact that, as shown in FIG. 8B, variations occur in angle $\theta$ among neighboring pixel data if the assumed light source is not correct. That is, since neighboring pixel data are in many cases part of a projected image of the same object (same material component), if the assumed light source is correct, then in many cases the angle $\theta$ becomes the same among neighboring pixel data.

Figure 9A:
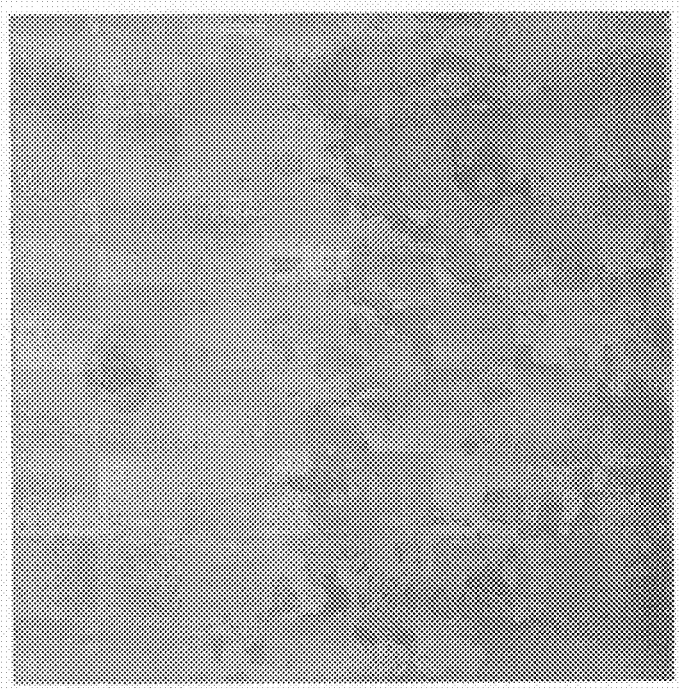
FIGS. 9A and 9B are diagrams each showing a specific example of an angle θ according to the embodiment of the present invention.
Figure 9B:
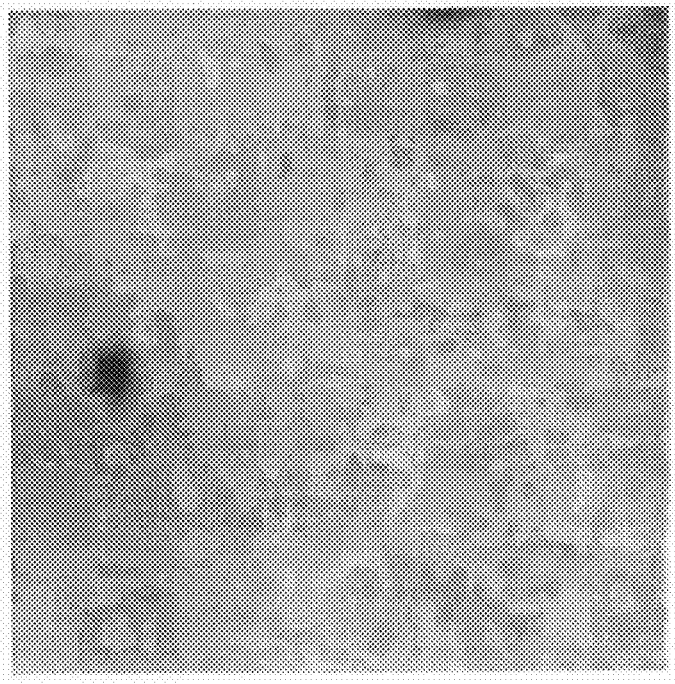

FIGS. 9A and 9B show a specific example of an image illustrating the angle $\theta$ according to the embodiment of the present invention. This image shows the angle $\theta$ with respect to portions of the same material component in a given input image. The angle $\theta$ is expressed by luminance. Portions that are similar in angle $\theta$ are also similar in luminance.

FIG. 9A represents a case where the assumed light source is correct, and FIG. 9B represents a case where the assumed light source is not correct. A comparison between the two cases reveals that a greater number of small regions are present in the case where the assumed light source is not correct than in the case where the assumed light source is correct.

Figure 10:
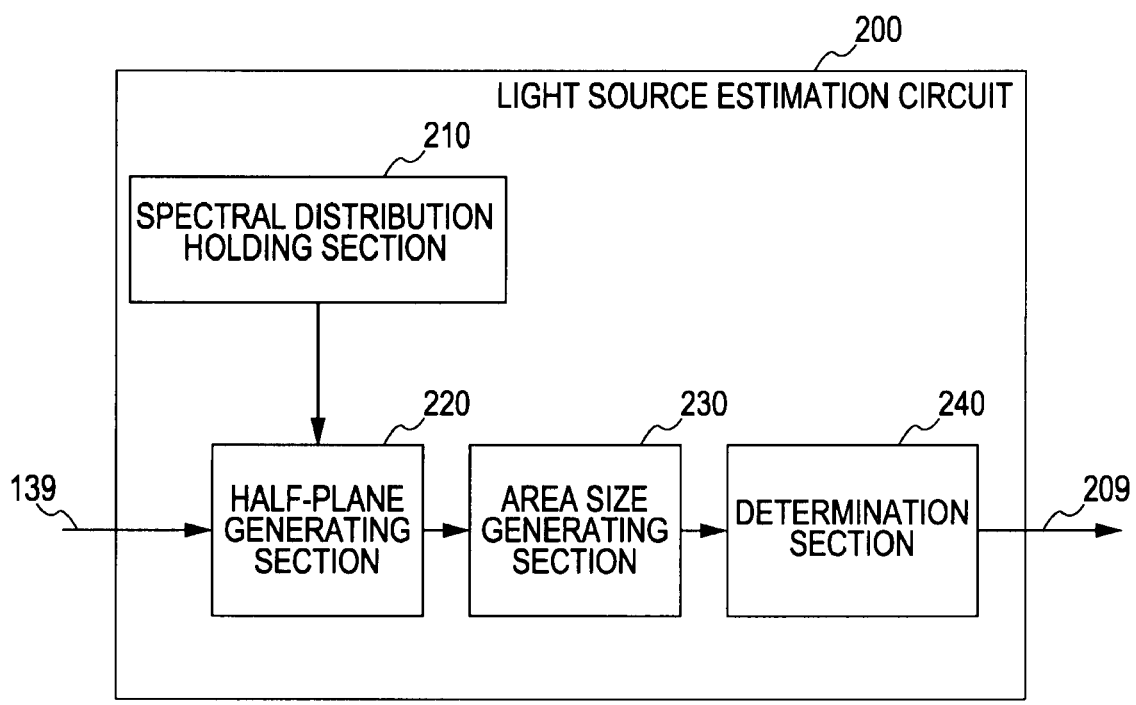
FIG. 10 is a diagram showing an example of the configuration of a light source estimation circuit 200 according to the embodiment of the present invention.

FIG. 10 is a diagram showing an example of the configuration of the light source estimation circuit 200 according to the embodiment of the present invention. The light source estimation circuit 200 includes a spectral distribution holding section 210, a half-plane generating section 220, an area-size generating section 230, and a determination section 240.

The spectral distribution holding section 210 holds the spectral energy distributions of candidate light sources as specular reflection components (specular components). In this case, as an example, the spectral energy distributions of the following four kinds of light source: (1) sunlight; (2) an electric bulb; (3) a fluorescent lamp; and (4) an LED lighting are held in a ROM (Read Only Memory) in advance.

Let the vector of the specular component held in the spectral distribution holding section 210 be (Rsi, Gsi, Bsi). In this case, i is an integer of 1 to 4, and specifies one of the four kinds of light source described above.

The half-plane generating section 220 determines, with respect to each of pixel data in the coordinates (x, y) of an input image supplied from the demosaic block 130 via the signal line 139, the angle θ of a half plane specified between the pixel data and the specular component of an assumed light source. In this case, the specular component of the assumed light source is selected from the specular components held in the spectral distribution holding section 210. Further, the size of an input image is set as xmax×ymax. That is, $1 \leq x \leq xmax$, $1 \leq y \leq ymax$. It should be noted that x, y, xmax, and ymax are positive integers.

In determining the angle θ(x, y), it is desirable to take into account an error in the image data of an input image. The range of this error is set as (±δr, ±δg, ±δb) in RGB color space. That is, the angle θ(x, y) to be determined is represented as a set of {θ that specifies a half plane including a single arbitrary point (R', G', B') that satisfies θ|R(x, y)−δr≦R'≦R(x, y)+δr, G(x, y)−δg≦G'≦G(x, y)+δg, B(x, y)−δb≦B'≦B(x, y)+δb, and the vector (Rsi, Gsi, Bsi)}. As exceptional processing, since a half plane cannot be specified in the case where the point (R', G', B') that satisfies R(x, y)−δr≦R'≦R(x, y)+δr, G(x, y)−δg≦G'≦G(x, y)+δg, B(x, y)−δb≦B'≦B(x, y)+δb is in the same direction as the vector (Rsi, Gsi, Bsi), in such a case, {θ|0 degree≦θ≦360 degrees}.

As described above, a half plane includes a point (cos θ, 0, sin θ) in the plane of G=0. Accordingly, first, the equation of a plane including the following three points, the origin, a point (cos θ, 0, sin θ), and (Rsi, Gsi, Bsi) in RGB 3-dimensional color space is given as follows.

$$Sr \times R + Sg \times G + Sb \times B = 0,$$

wherein
Sr=−sin θ,
Sg=(Rsi×sin θ−Bsi×cos θ)÷Gsi, and
Sb=cos θ.

Further, an arbitrary point (R', G', B') on a half plane specified by given θ satisfies the following two equations:

$$Sr \times R' + Sg \times G' + Sb \times B' = 0 \qquad \text{(Equation A);}$$

and $$\cos \theta \times \{R' - (R' \times Rsi + G' \times Gsi + B' \times Bsi) \times Rsi\} + \sin \theta \times \{B' - (B' \times Rsi + G' \times Gsi + B' \times Bsi) \times Bsi\} \geq 0 \qquad \text{(Equation B).}$$

In other words, if the Equations A and B are satisfied, it means that the point (R', G', B') exists on the half plane specified by θ. This is due to the reason as described below. That is, of the points on a straight line passing between the origin and (Rsi, Gsi, Bsi), the R, G, and B coordinates of the point closest to the point (R', G', B') are respectively (R'×Rsi+G'×Gsi+B'×Bsi)×Rsi,
(R'×Rsi+G'×Gsi+B'×Bsi)×Gsi, and
(R'×Rsi+G'×Gsi+B'×Bsi)×Bsi.

When a vector with this as the initial point and (R', G', B') as the end point is considered, the inner product of this vector and (cos θ, 0, sin θ) becomes equal to or larger than 0.

To determine the angle θ in the half-plane generating section 220, the value of θ is increased from 0.0 to 360.0, and it is checked whether or not a point that is included on the "half plane specified by θ" exists on the twelve edges of a regular hexahedron (that is, pixel data that takes into account an error at the pixel position (x, y) having the following eight points as the vertices:

point (R(x, y)−δr, G(x, y)−δg, B(x, y)−δb);
point (R(x, y)+δr, G(x, y)−δg, B(x, y)−δb);
point (R(x, y)−δr, G(x, y)+δg, B(x, y)−δb);
point (R(x, y)+δr, G(x, y)+δg, B(x, y)−δb);
point (R(x, y)−δr, G(x, y)−δg, B(x, y)+δb);
point (R(x, y)+δr, G(x, y)−δg, B(x, y)+δb);
point (R(x, y)−δr, G(x, y)+δg, B(x, y)+δb); and
point (R(x, y)+δr, G(x, y)+δg, B(x, y)+δb).

Then, if there is at least one point on the twelve edges which is included in the half plane, the current value of θ is registered into a half-plane list. That is, if there is even only one (R', G', B') on the twelve edges which satisfies the above-mentioned Equations A and B, the current value of θ is registered into a half-plane list.

The half-plane list generated as described above is supplied to the area-size generating section 230. It should be noted that a half-plane list holds an arbitrary number of the values of the angle θ, and its data structure is not particular limited. However, since an arbitrary number of the values of the angle θ are added on and on, it is desirable that the date structure be variable.

On the basis of the half-plane list supplied from the half-plane generating section 220, the area-size generating section 230 subjects other pixel data neighboring each pixel data and with the same angle θ into grouping, and determines the average size of the areas divided by that grouping.

The area-size generating section 230 determines the "size S of an area including a pixel position (x, y)" at all the pixel positions (x, y) of an input image, and outputs the average of the area sizes S thus determined as the "average size MS of the areas divided by grouping". That is, $$MS = (\Sigma S) \div (xmax \times ymax)$$

It should be noted that Σ in the above equation is the sum with respect to x and y.

Further, of the values of θ' that satisfy θ'∈{θ(x, y)}, with the value of θ' that makes the element number of an area A (x, y, θ') maximum being taken as θ0, the element number of the area A (x, y, θ') becomes "the size of an area including the pixel position (x, y)". In this case, the area A (x, y, θ') is an area formed by an aggregate of such pixel positions (x0, y0) that, when line segments each connecting two adjacent pixel positions (x1, y1) and (x2, y2) only if both satisfy θ'∈{θ(x1, y1)} and θ'∈{θ(x2, y2)} are considered, (x0, y0) can be reached from (x, y) by following these line segments.

As a result of the operation of performing grouping if there are pixel positions that are located adjacent to each other and have the same value of θ, an image is divided into a plurality of areas. Of these areas, an area including the "focused pixel position (x, y)" is considered. Since there is an error in input data, the angle θ is not uniquely determined, and neither is the grouping (area division). For this reason, by changing the value of θ within an error range, one that makes the size of the area including the "focused pixel position (x, y)" maximum is determined. This corresponds to A (x, y, θ0). This means that even when taking an error into account, the area including the "focused pixel position (x, y)" does not exceed A (x, y, θ0) in size.

This is illustrated in FIG. 11. In this case, the angle θ at a pixel position (x, y) 71 is assumed to be 0.5. Further, the angle θ at a pixel position (x0, y0) 72 is also 0.5. Since the angle θ is 0.5 also in a pixel position adjacent to the pixel positions 71 and 72, it follows that the pixel position 72 and the pixel position 71 exist within the same area. In actuality, an area 70 including the pixel positions 71 and 72 satisfy the condition of the area A described above.

To extract such an area, for example, a memory map M (1 to xmax, 1 to ymax) with 1 bit assigned to each pixel of an input image is assumed, and this memory map is updated over and over, so the final number of pixels whose bit values are 1 is obtained as a candidate of the size of that area. That is, by resetting all bits of the memory map to "0" in advance, only M(x, y) corresponding to the pixel position (x, y) being focused is set to "1". Then, the following three judgments are made with respect to all of the pixel positions in the raster scan order.

(Judgment 1) In the case where data "1" has already been assigned to the pixel position of a memory map to be investigated, this is left as it is as "1", and the data assigned to that pixel position is not updated.

(Judgment 2) In the case where data "0" has been assigned to the pixel position of a memory map to be investigated, and data "1" has been assigned to at least one of four adjacent pixel positions located above the below, and on the right and left of that pixel position, if the angle θ at the pixel position to be investigated is the same, that data is updated from "0" to "1". If the angle θ at the pixel position to be investigated is not the same, that data is not updated.

(Judgment 3) In the case where data "0" has been assigned to the pixel position of a memory map to be investigated, and data "0" has been assigned to all of four adjacent pixel positions located above the below, and on the right and left of that pixel position, the data at the pixel position to be investigated is left as it is as "0", and the data assigned to that pixel position is not updated.

If, as a result of making these three judgments with respect to all of pixel positions in the raster scan order, updating is performed at one of the pixel positions, that processing is repeated further. When updating ceases to be performed at any of the pixel positions, the number of pixels whose values are "1" in the memory map at that time becomes a candidate of the size of that area. As a result of performing such processing by increasing the value of θ' from 0.0 to 360.0, the largest one among the candidates of area size is obtained as the area size.

The area-size generating section 230 determines the average of the area sizes thus obtained at all the pixel positions for each assumed light source, and supplies it to the determination section 240 as the average area size.

The determination section 240 determines which light source is correct on the basis of the average area size for each light source supplied from the area-size generating section 230. That is, the determination section 240 determines a light source with the largest average area size as the correct light source. This determination result is supplied to the image-processing-parameter setting section 300 via the signal line 209.

Next, the operation of the imaging apparatus 100 according to the embodiment of the present invention will be described with reference to the drawings.

Figure 12:
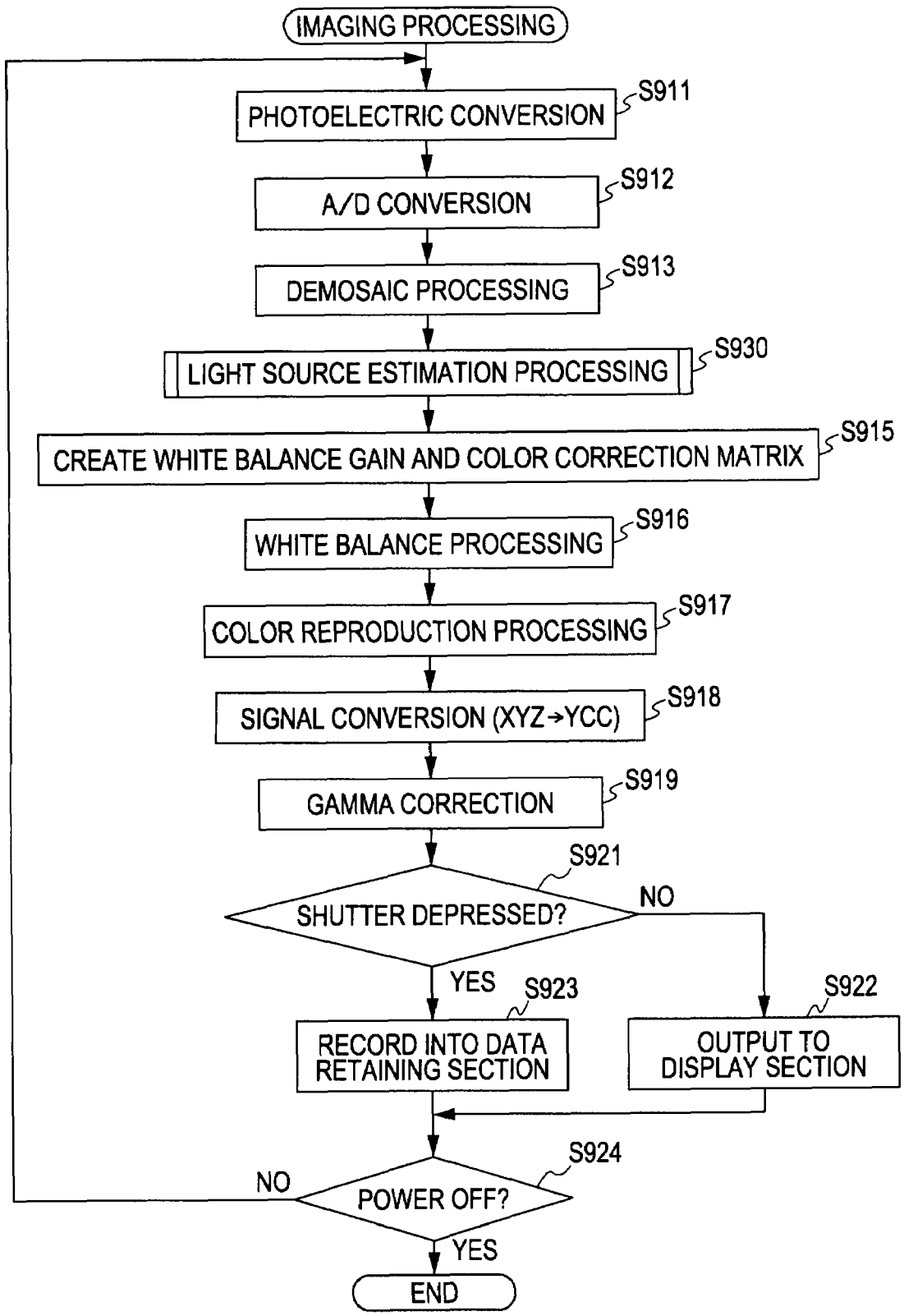
FIG. 12 is a flow chart showing an example of the procedure of processing of the imaging apparatus according to the embodiment of the present invention.

FIG. 12 is a flow chart showing an example of the procedure of processing of the imaging apparatus 100 according to the embodiment of the present invention. When the power is turned on, light received by the imaging device 110 via a lens (not shown) is taken in as an input image.

The input image is subjected to photoelectric conversion by the imaging device 110 and outputted as an electrical signal (voltage value) (step S911). This electrical signal is converted from an analog signal into a digital signal by the A/D conversion circuit 120 (step S912). Then, this digital signal is subjected to demosaic processing by the demosaic block 130 (step S913). The pixel data on which demosaic processing has been thus performed is supplied to the light source estimation circuit 200 and the white balance circuit 140.

In the light source estimation circuit 200, the light source used in the capture of an input image is estimated on the basis of the pixel data (step S930). The kind of light source estimated by this light source estimation processing is supplied to the image-processing-parameter setting section 300.

On the basis of the kind of light source thus estimated, the image-processing-parameter setting section 300 reads a white balance gain and a color correction matrix from a look-up table as the parameters for image processing (step S915). The white balance gain is supplied to the white balance circuit 140, and the color correction matrix is supplied to the color reproduction processing circuit 150.

The white balance circuit 140 performs white balance processing by multiplying the pixel data supplied from the demosaic block 130 by a corresponding white balance gain supplied from the image-processing-parameter setting section 300 (step S916). Further, the color reproduction processing section 150 performs color reproduction processing by multiplying the pixel data on which white balance processing has been performed by the white balance circuit 140, by the color correction matrix supplied from the image-processing-parameter setting section 300 (step S917). Due to this color reproduction processing, the pixel data becomes a single point in XYZ space.

The signal conversion processing circuit 160 performs conversion from XYZ space into YCC format (step S918). The gamma correction circuit 170 performs gamma correction according to a gamma value of the display section 181 or the like (step S919).

The input image that has undergone the above-mentioned processing is outputted as a monitor image to the display section 181 when the shutter button in the user interface 190 is not being depressed (step S922). On the other hand, when the shutter button is depressed, the input image at that time is recorded into the data holding section 182 as image data (step S923). The series of these processing are repeated until the power is turned off (step S924).

Figure 13:
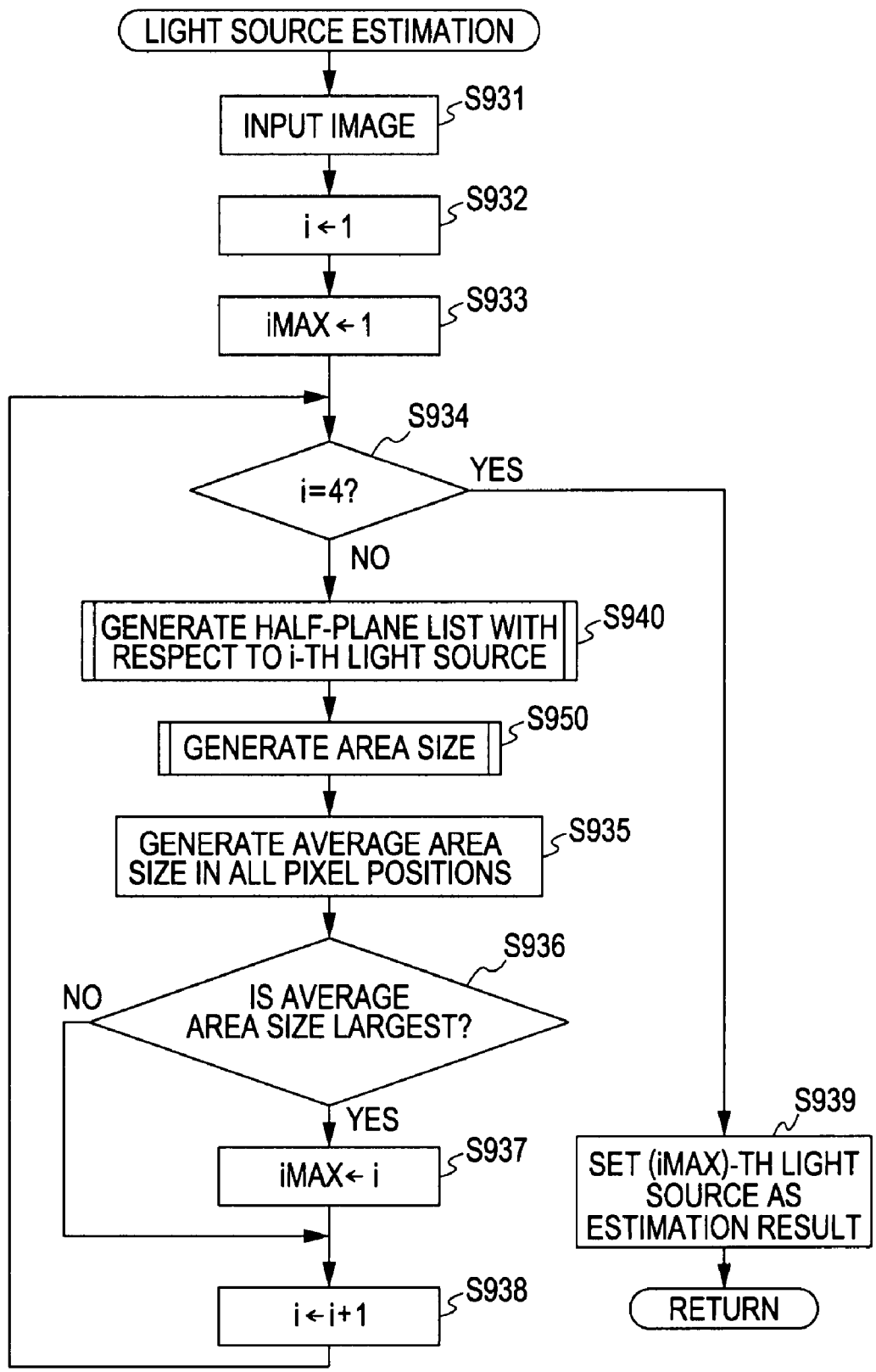
FIG. 13 is a flow chart showing an example of the procedure of light source estimation processing according to the embodiment of the present invention.

FIG. 13 is a flow chart showing an example of the procedure of light source estimation processing (step S930) according to the embodiment of the present invention. An image captured by the imaging device 110 is inputted to the light source estimation circuit 200 via the A/D conversion circuit 120 and the demosaic block 130 (step S931). Then, a variable i indicating the number of an assumed light source, and a variable iMAX that holds the maximum value thereof are both set to "1" (steps S932 and S933).

It should be noted that in this case, four kinds of light source including sunlight (a first light source), an electric bulb (a second light source), a fluorescent lamp (a third light source), and an LED lighting (a fourth light source) are assumed as the light source. While increasing the variable i in increments of 1 (step S938), the following processing is performed with respect to each of these four kinds of light source (step S934).

First, a half-plane list is generated with respect to the i-th light source (step S940). This half-plane list records the angle θ of a half plane specified by each pixel data of an input image and the specular component of the i-th light source. This half-plane list is generated with respect to all the pixel data of the input image. It should be noted that the procedure for generating this half-plane list will be described with reference to FIG. 14.

Then, on the basis of the generated half-plane list, an area size is generated with respect to each pixel data of the input image (step S950). As described above with reference to FIG. 11, this area is an area where the angle θ is equal in the neighborhood of a focused pixel position (x, y). This area size is generated with all the pixel data of the input image respectively taken as the "focused pixel position". It should be noted that the procedure for generating this area size will be described with reference to FIG. 15.

The area size generated with respect to each pixel data of the input image is added up for all the pixel data of the input image, and the result is divided by the total number of pixels to generate an average area size (step S935). If that average area size is larger than the average area sizes due to other light sources (step S936), the value of the variable i is held into the variable iMAX (step S936).

The value held in the variable iMAX after thus generating the average area size with respect to each of the four kinds of light source is the number of the estimated light source. That is, the (iMAX)-th light source is the estimation result (step S939).

Figure 14:
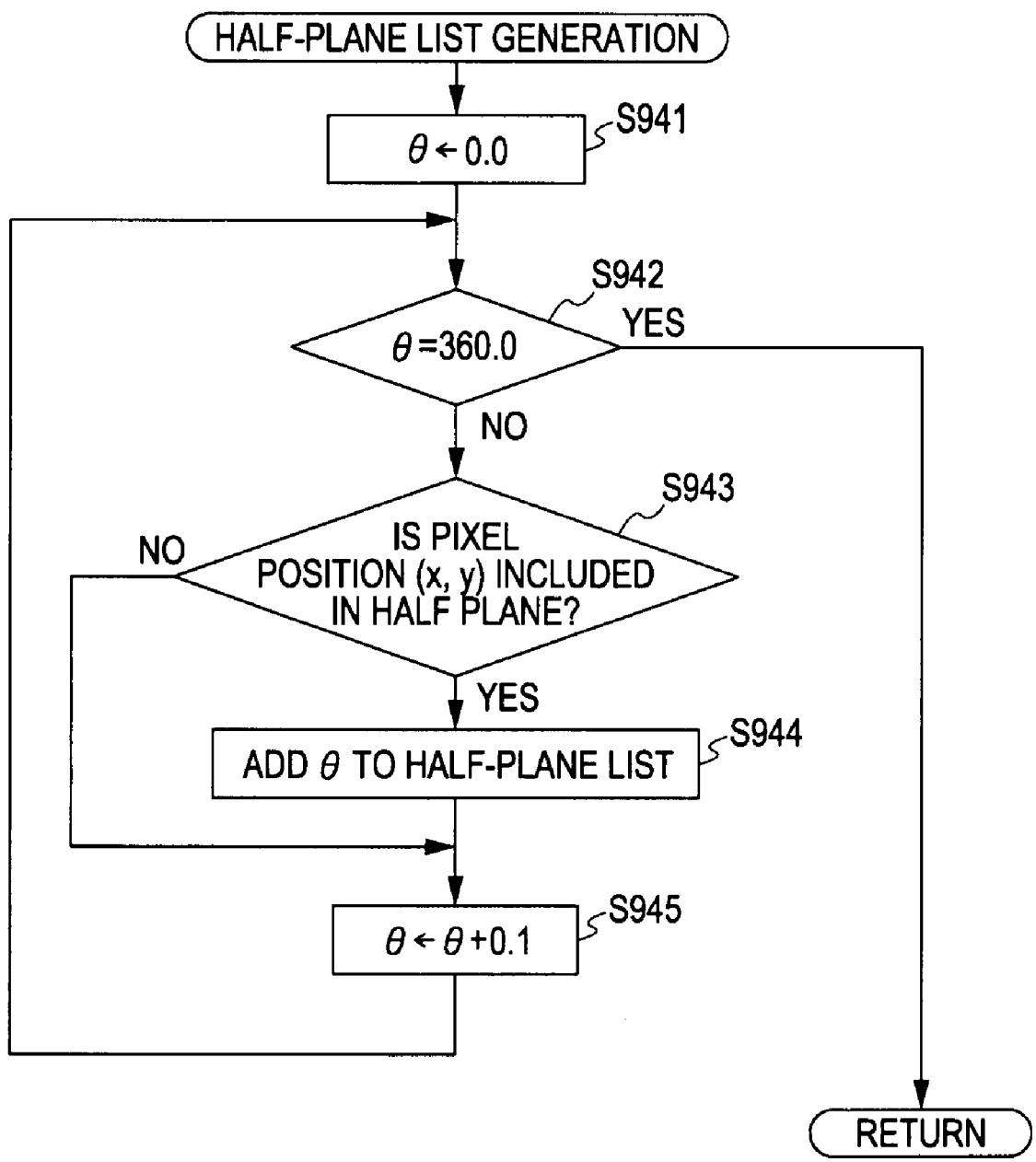
FIG. 14 is a flow chart showing an example of the procedure of half-plane list generation processing according to the embodiment of the present invention.

FIG. 14 is a flow chart showing an example of the procedure of half-plane list generation processing (step S940) according to the embodiment of the present invention. In this case, by increasing the angle θ for specifying a half plane in increments of "0.1" from "0.0" to "359.9", it is successively checked whether or not the angle θ is included in the half plane.

First, "0.0" is set as an initial value for the angle θ (step S941). Then, while increasing the angle θ in increments of "0.1" (step S945), until the angle θ reaches "360.0" (step S942), it is judged whether or not a focused pixel position (x, y) is included in the half plane (step S943). If the focused pixel position (x, y) is included in the half plane, the angle θ at that time is added to the half-plane list (step S944).

The determination as to whether or not a focused pixel position (x, y) is included in the half plane can be made by, as described above, checking whether or not there is a point that is included on the "half plane specified by θ", on the twelve edges of a regular hexahedron that takes an error in the pixel position (x, y) into account. That is, if there is even one (R', G', B') from among points on the twelve edges which satisfies the above-mentioned two equations, Equations A and B, then the value of θ at that time is registered into the half-plane list.

It should be noted that while the flow chart of FIG. 14 shows processing with respect to one pixel position (x, y), for the entire processing, the above-mentioned processing is performed with respect to all the pixel data of an input image.

Figure 15:
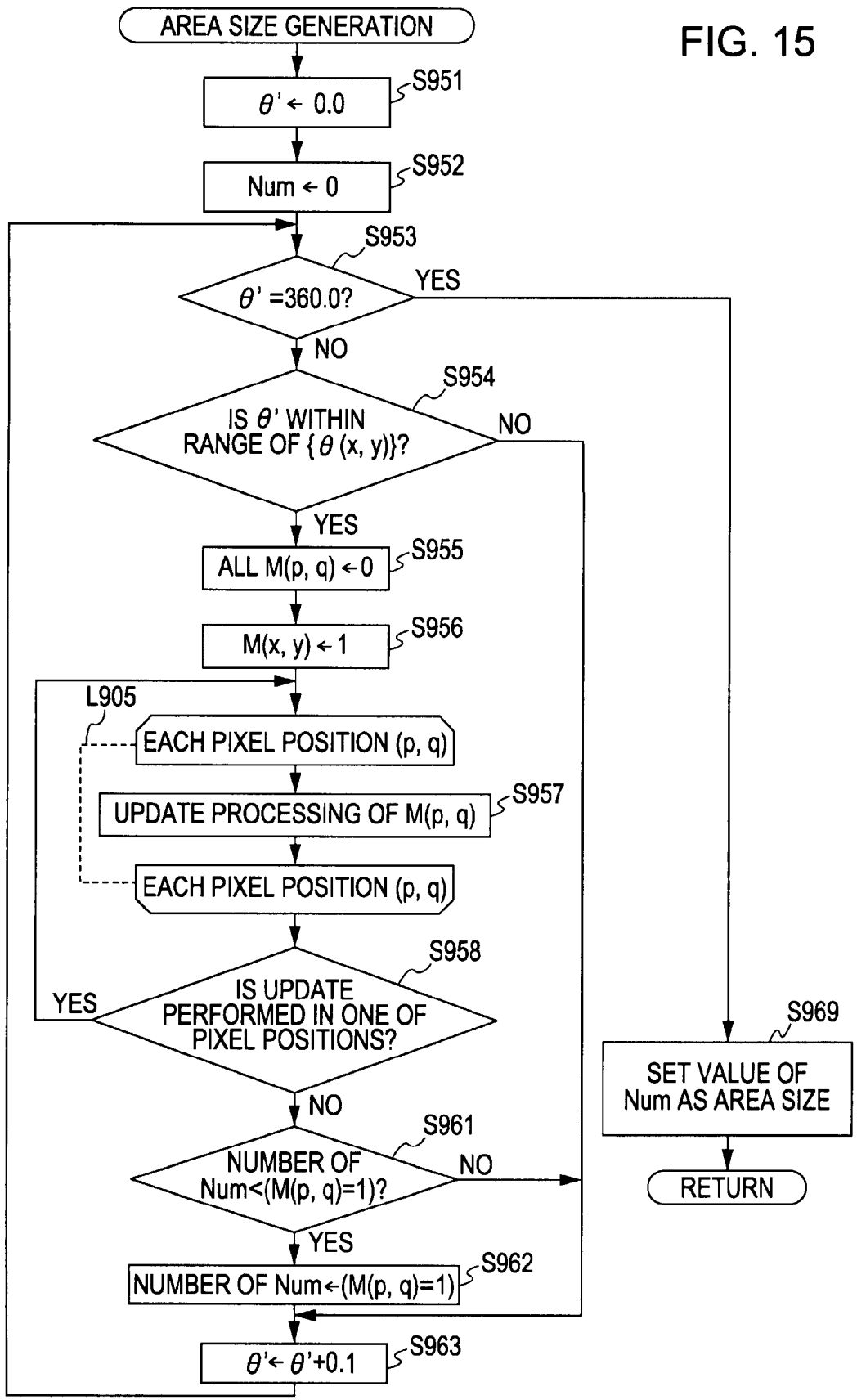
FIG. 15 is a flow chart showing an example of the procedure of area-size generation processing according to the embodiment of the present invention.

FIG. 15 is a flow chart showing an example of the procedure of area-size generation processing (step S950) according to the embodiment of the present invention. In this case, by increasing the angle θ' for specifying a half plane in increments "0.1" from "0.0" to "359.9", the area size in the neighborhood of a pixel position (x, y) with that angle θ' included in the half-plane list is determined.

First, "0.0" is set as an initial value for the angle θ' (step S951), and "0" is set as an initial value for a variable Num that holds an area size (step S952). Then, while increasing the angle θ' in increments of "0.1" (step S963), until the angle θ' reaches "360.0" (step S953), it is determined whether or not that angle θ' is included in the half-plane list of the focused pixel position (x, y) (step S954). If that angle θ' is included in the half-plane list of the focused pixel position (x, y), the following processing is performed.

To determine the area size in the neighborhood of the pixel position (x, y), after all the bits of the memory map M (1 to xmax, 1 to ymax) with 1 bit assigned to each pixel of an input image are set to "0" (step S955), only M(x, y) corresponding to the focused pixel position (x, y) is set to "1" (step S956).

Then, the memory map M is subjected to update processing on the basis of the above-mentioned three judgments (step S957). These three judgments are performed with respect to all of the pixel positions (p, q) in the raster scan order (loop L905). It should be noted that p and q are positive integers, and $1 \leq p \leq xmax$ and $1 \leq q \leq ymax$.

In the update processing of the memory map (step S957), if an update is actually performed at one of the pixel positions, the update processing of the memory map M is further performed with respect to all of the pixel positions (p, q) in the raster scan order (step S958).

When updating ceases to be performed in the update processing (step S957) of the memory map M (step S958), the number of "1"s at the respective pixel positions of the memory map M (hereinafter, referred to as the element number) is compared with the value of the variable Num (step S961). Then, if the element number is larger than the value of the variable Num, the element number is held into the variable Num (step S962).

The above-mentioned processing is performed until the angle θ' becomes "359.9", and the value of the variable Num at the time when the angle θ' reaches "360.0" becomes the area size at the focused pixel position (x, y) (step S969).

It should be noted that while the flow chart of FIG. 15 shows processing with respect to one pixel position (x, y), for the entire processing, the above-mentioned processing is performed with respect to all the pixel data of an input image.

As described above, according to the embodiment of the present invention, the area size at each pixel position of an input image is generated by the area-size generating section 230 on the basis of a half plane list generated by the half-plane generating section 220 with respect to an assumed light source, thereby making it possible for the determination section 240 to determine whether or not the assumed light source is correct. Accordingly, as opposed to the specular method of the related art in which the "spectral energy distribution of a light source" is obtained by "grouping pixels", in the embodiment of the present invention, by "assuming a given spectral energy distribution of a light source" and determining "how pixels are grouped", it is possible to estimate whether or not an assumed light source is a correct light source without specifying portions of equal material component manually.

The embodiment of the present invention has been described as an example for implementing the present invention, and has correspondence to the invention-specifying matters in the claims as will be described below. However, the present invention is not limited to the embodiment, and various modifications can be made to the present invention without departing from the scope of the present invention.

That is, in Claim 1, the distribution holding means corresponds to the spectral distribution holding section 210, for example. The set generating means corresponds to the half-plane generating section 220, for example. The detecting means corresponds to the area-size generating section 230, for example. The determination means corresponds to the determination section 240, for example.

Further, in claim 4, the distribution holding means corresponds to the spectral distribution holding section 210. The set generating means corresponds to the half-plane generating section 220, for example. The area-size generating means corresponds to the area-size generating section 230, for example. The determination means corresponds to the determination section 240, for example.

Further, in Claim 5, the imaging means corresponds to the imaging device 110, for example. The distribution holding means corresponds to the spectral distribution holding section 210. The set generating means corresponds to the half-plane generating section 220, for example. The area-size generating means corresponds to the area-size generating section 230, for example. The determination means corresponds to the determination section 240, for example. The white balance processing means corresponds to the white balance circuit 140, for example. The color reproduction processing means corresponds to the color reproduction processing circuit 150, for example.

Further, in Claims 6 and 7, the set generating step corresponds to step S940, for example. The area-size generating step corresponds to step S950, for example. The determining step corresponds to steps S936 to S939, for example.

It should be noted that the process steps described in the embodiment of the present invention may be considered as a method including the series of these steps or may be considered as a program for causing a computer to execute the series of these steps and a recording medium storing the program.

What is claimed is:

1. A light source estimating device for estimating a kind of a light source used during capture of an input image, comprising:
    distribution holding means for holding a spectral energy distribution of a specific light source as a specular reflection component;
    set generating means for generating a set of angles between a reference half-plane defined by the specular reflection component and half-planes corresponding to pixel data of the input image in a predetermined space, by determining an angle value between a half-plane specified by specific pixel data of the input image, and the reference half-plane, and registering the angle value in a set;
    detecting means for detecting, by accessing the set, neighboring pixel data included in the set having the same angle value as the specific pixel data; and
    determining means for determining whether or not the specific light source corresponds to the light source used during capture of the input image, by setting a high likelihood that the specific light source corresponds to the light source used during capture if neighboring pixel data having the same angle value exists, and setting a low likelihood that the specific light source corresponds to the light source used during capture if neighboring pixel data having the same angle value does not exist.

2. The light source estimating device according to claim 1, wherein the set includes at least a part of a two-dimensional plane in color space.

3. The light source estimating device according to claim 1, wherein the specular reflection component is a vector component whose initial position is an origin in color space.

4. A light source estimating device for estimating a kind of a light source used during capture of an input image, comprising:
    distribution holding means for holding spectral energy distributions of a plurality of light sources as specular reflection components;
    set generating means for generating a set of angles between a reference half-plane defined by the specular reflection component and half-planes corresponding to pixel data of the input image for each of the plurality of light sources in a predetermined space, by determining an angle value between a half-plane specified by specific pixel data of the input image, and the reference half-plane, and registering the angle value in a set;
    area-size determining means for determining, for the plurality of light sources, a size of an area neighboring the specific pixel data which includes pixel data having the same angle value as the specific pixel data included in the set; and
    determining means for determining, from among the plurality of light sources, an estimate light source with the largest area size, and processing the pixel data according to the estimate light source.

5. An imaging apparatus comprising:
    imaging means for capturing an input image;
    distribution holding means for holding spectral energy distributions of a plurality of light sources as specular reflection components;
    set generating means for generating a set of angles between a reference half-plane defined by the specular reflection component and half-planes corresponding to pixel data of the input image for each of the plurality of light sources in a predetermined space, by determining an angle value between a half-plane specified by specific pixel data of the input image, and the reference half-plane, and registering the angle value in a set;
    area-size determining means for determining, for the plurality of light sources, a size of an area neighboring the specific pixel data which includes pixel data having the same angle value as the specific pixel data included in the set; and
    determining means for determining, from among the plurality of light sources, an estimate light source with the largest area size;
    white balance processing means for performing white balance processing of the input image based on the estimate light source; and
    color reproduction processing means for performing color reproduction processing with respect to an output of the white balance processing means based on the estimate light source.

6. A light source estimation method which is used in a light source estimating device to estimate a kind of a light source used during capture of an input image, the light source estimating device including distribution holding means for holding spectral energy distributions of a plurality of light sources as specular reflection components, comprising the steps of:
    generating a set of angles between a reference half-plane defined by the specular reflection component and half-planes corresponding to pixel data of the input image for each of the plurality of light sources in a predetermined space, by determining an angle value between a half-plane specified by specific pixel data of the input image, and the reference half-plane, and registering the angle value in a set;
    determining, for the plurality of light sources, a size of an area neighboring the specific pixel data which includes pixel data having the same angle value as the specific pixel data included in the set; and
    determining, from among the plurality of light sources, an estimate light source with the largest area size, and processing the pixel data according to the estimate light source.

7. A computer-readable recording medium storing a program which is used in a light source estimating device to estimate a kind of a light source used during capture of an input image, the light source estimating device including distribution holding means for holding spectral energy distributions of a plurality of light sources as specular reflection components, the program, when executed by a processor, causing a computer to execute the steps of:
    generating a set of angles between a reference half-plane defined by the specular reflection component and half-planes corresponding to pixel data of the input image for each of the plurality of light sources in a predetermined space, by determining an angle value between a half-plane specified by specific pixel data of the input image, and the reference half-plane, and registering the angle value in a set;

determining, for the plurality of light sources, a size of an area neighboring the specific pixel data which includes pixel data having the same angle value as the specific pixel data included in the set; and determining, from among the plurality of light sources, an estimate light source with the largest area size, and processing the pixel data according to the estimate light source.

8. A light source estimating device for estimating a kind of a light source used during capture of an input image, comprising:

a distribution holding section holding a spectral energy distribution of a specific light source as a specular reflection component;

a set generating section generating a set of angles between a reference half-plane defined by the specular reflection component and half-planes corresponding to pixel data of the input image in a predetermined space, by determining an angle value between a half-plane specified by specific pixel data of the input image, and the reference half-plane, and registering the angle value in a set;

a detecting section detecting, by accessing the set, neighboring pixel data included in the set having the same angle value as the specific pixel data; and a determining section determining whether or not the specific light source corresponds to the light source used during capture of the input image, by setting a high likelihood that the specific light source corresponds to the light source used during capture if neighboring pixel data having the same angle value exists, and setting a low likelihood that the specific light source corresponds to the light source used during capture if neighboring pixel data having the same angle value does not exist.

9. A light source estimating device for estimating a kind of a light source used during capture of an input image, comprising:

a distribution holding section holding spectral energy distributions of a plurality of light sources as specular reflection components;

a set generating section generating a set of angles between a reference half-plane defined by the specular reflection component and half-planes corresponding to pixel data of the input image for each of the plurality of light sources in a predetermined space, by determining an angle value between a half-plane specified by specific pixel data of the input image, and the reference half-plane, and registering the angle value in a set;

an area-size determining section determining, for the plurality of light sources, a size of an area neighboring the specific pixel data which includes pixel data having the same angle value as the specific pixel data included in the set; and a determining section determining, from among the plurality of light sources, an estimate light source with the largest area size, and processing the pixel data according to the estimate light source.

10. An imaging apparatus comprising:

an imaging section capturing an input image;

a distribution holding section holding spectral energy distributions of a plurality of light sources as specular reflection components;

a set generating section generating a set of angles between a reference half-plane defined by the specular reflection component and half-planes corresponding to pixel data of the input image for each of the plurality of light sources in a predetermined space, by determining an angle value between a half-plane specified by specific pixel data of the input image, and the reference half-plane, and registering the angle value in a set;

an area-size determining section determining, for the plurality of light sources, a size of an area neighboring the specific pixel data which includes pixel data having the same angle value as the specific pixel data included in the set; and a determining section determining, from among the plurality of light sources, an estimate light source with the largest area size;

a white balance processing section performing white balance processing of the input image based on the estimate light source; and a color reproduction processing section performing color reproduction processing with respect to an output of the white balance processing means based on the estimate light source.

* * * * *